C. W. LEVALLEY.
NUT LOCKING DEVICE.
APPLICATION FILED NOV. 30, 1908.
967,790.
Patented Aug. 16, 1910.
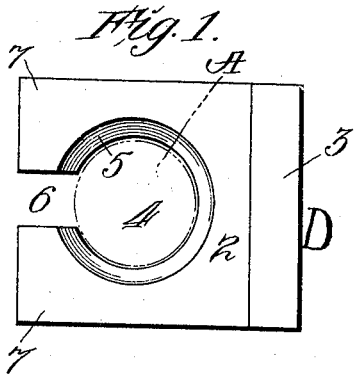
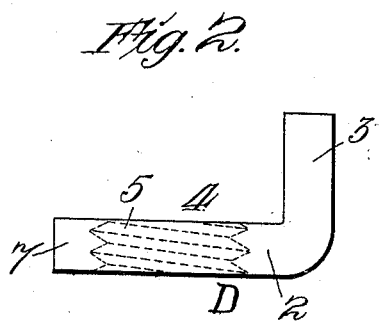
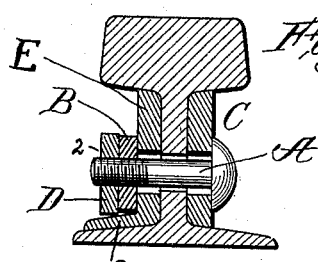
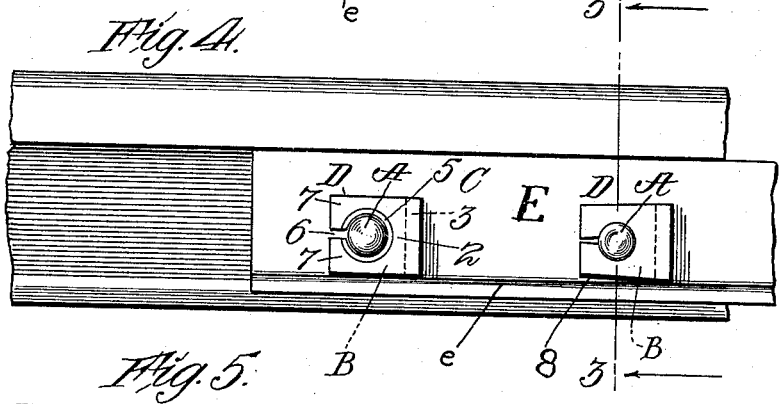
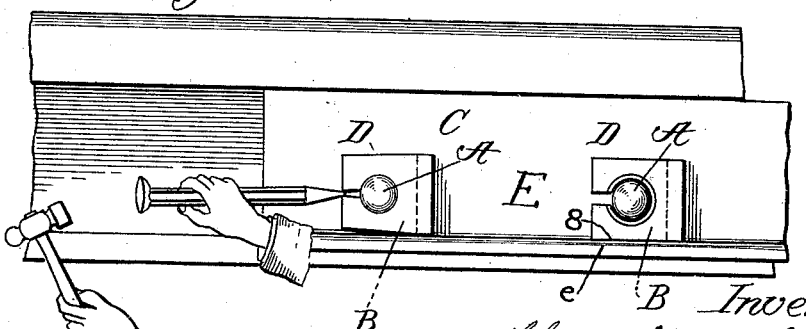
Inventor
Christopher W. Levalley
By his Attorney:
J. S. Barker
Witnesses:
Paul J. Gathmann
L. C. Brady

UNITED STATES PATENT OFFICE.

CHRISTOPHER W. LEVALLEY, OF MILWAUKEE, WISCONSIN.

NUT-LOCKING DEVICE.

967,790.   Specification of Letters Patent.   Patented Aug. 16, 1910.

Application filed November 30, 1908. Serial No. 465,261.

*To all whom it may concern:*

Be it known that I, CHRISTOPHER W. LEVALLEY, a citizen of the United States, residing at Milwaukee, in the county of Milwaukee and State of Wisconsin, have invented certain new and useful Improvements in Nut-Locking Devices, of which the following is a specification.

My invention has for its object to produce a device for locking a nut in place upon its bolt, having especially in view to produce a nut-lock that may be easily applied to the bolt, easily removed therefrom, and which is adapted to be repeatedly used.

In the accompanying drawings Figure 1 is a front view of a nut-lock embodying my invention in condition to be applied to a bolt. Fig. 2 is an edge view of the nut-lock shown in Fig. 1. Fig. 3 is a vertical section of a railway rail joint taken on the line 3—3 of Fig. 4, illustrating the use of my invention. Fig. 4 is a side elevation of a rail joint to which my invention is applied. Fig. 5 is a view similar to Fig. 4 illustrating the method of removing the nut-lock.

In the drawings, A represents a bolt threaded at one end to receive a nut B, and C indicates in a general way the parts united by such bolt and nut.

I have chosen the parts of a railway joint as the objects to be united for the purpose of illustrating my invention. I wish to be understood, however, as not restricting my invention to any particular use as it is adapted to be employed under a vast variety of circumstances where it is desirable to lock a nut upon its bolt to prevent it working loose under the jars, strains, vibrations and other forces or movements which tend to loosen a nut upon its bolt.

The invention consists of a piece of malleable metal of suitable shape and size in which is formed an internally-screw-threaded aperture or perforation of a diameter slightly greater than that of the bolt in connection with which the lock is to be used, in order that the lock may be passed endwise over the bolt and into engagement with the nut, which may have been screwed into place thereupon. The body of the piece of metal is slotted between one edge and the said perforation, in order to form a pair of arms disposed on opposite sides of the opening formed by the slot and perforation and united by the body of the metal on the side of the aperture opposite the slot. This same side of the nut-lock, that is the side opposite the slot, is provided with means adapted to engage with some object other than the bolt or the nut to prevent the rotation of the nut-lock upon the bolt after it has been applied thereto.

Such being the general construction of my nut-lock I will describe the specific embodiment thereof illustrated in the drawings, where I have shown a lock adapted to hold a square nut.

D represents the locking device as an entirety. It consists of a plate of metal having two parts bent or disposed at right angles to each other—the main body of the lock, 2, and a flange 3, situated along one edge thereof. The part 2 is centrally perforated at 4 and formed with the internal screw-thread 5. The pitch of the thread corresponds with that of the thread upon the bolt A, but the aperture 4 is of a size to permit the plate 2 to be freely slipped endwise over the bolt so that it may be brought against the outer face of the nut after it has been screwed tightly in place.

6 refers to a slot extending through the body of the part 2 of the lock, from the edge opposite the flange 3 to the central aperture 4. The opening through the plate of the nut-lock, formed by the aperture 4 and the slot 6, forms two legs 7, 7, united by the body of the metal adjacent to the flange 3. At least one of the legs 7 is preferably provided with a flat face 8, substantially parallel with the slot 6 and adapted to rest firmly upon some abutment, such as the flange *e* of the fish bar E, when the lock is slipped to place against the nut, in order that the lock may be supported in such manner that the legs may be forced toward each other for engagement with a bolt, as will be described.

After a nut has been screwed tightly in place, as against the fish-bar of a rail joint, one of the locks is applied by slipping it endwise over the bolt until its face comes into engagement with the outer face of the nut, when the ends of the legs 7 are forced toward each other by a suitable closing tool or a hammer or in any desired manner. The result is that the lock is seated upon the bolt, its screw-threads 5 engaging with those of the bolt and preventing longitudinal movement thereof relative to the bolt. Were this all the lock would be no more than a sort of jam nut with little efficiency. I have therefore provided the plate or perforated part of the lock with the flange 3 that is arranged to engage with some stationary object adjacent to the nut and bolt, as the flange of the fish-bar of the rail joint. It is not necessary that the engagement of the threads 5 of the lock with those of the bolt should be perfect and in practice it is found that often only the portions of the thread toward the free ends of the legs 7 engage with the threads of the bolt.

It is frequently desirable to remove the lock in order to manipulate the nut, either to tighten it or to remove it. This can be done by separating the ends of the legs, causing a disengagement of the lock from the bolt, a cold chisel or other suitable tool being employed for this purpose. This removal of the lock does not seriously impair its efficiency as it may be applied and removed a number of times.

The particular means shown for preventing the turning of the lock upon the bolt—the flange 3—is but one of various means that may be adopted for this purpose. Thus the plate 2 might be unflanged and one of its straight edges, by engagement with some stationary object, independent of the bolt and nut, be made to serve the purpose of preventing the turning of the lock.

What I claim is:

1. An integral nut-lock consisting of a plate of malleable metal in which is formed an internally screw-threaded perforation of a diameter larger than that of the bolt to which it is to be applied, whereby it may be slipped longitudinally over the latter, the plate being cut between the perforation and one edge, forming legs 7, 7; and the plate being provided with means arranged to engage with some stationary object other than the bolt and the nut to prevent the turning of the lock, substantially as set forth.

2. A nut-lock consisting of a plate of metal in which is formed a screw-threaded perforation of a diameter greater than that of the bolt to which it is to be applied, the plate being slotted between the perforation and one of its edges, thus forming a pair of legs, and one of the legs being formed with a flat face substantially parallel with the slot leading to the said screw-threaded perforation in the plate, substantially as described.

3. The combination with a screw-threaded bolt and a nut thereupon of a lock for the nut, consisting of a plate of metal in which is formed a screw-threaded aperture, the metal of the plate being cut between the aperture and one of its edges, forming two legs, these legs being bent toward each other, whereby the screw-threads of the lock are forced into engagement with the threads of the bolt, the engagement of the threads near the said cut being closer or more intimate than the engagement at the opposite side of the bolt, substantially as set forth.

CHRISTOPHER W. LEVALLEY.

Witnesses:
 GEO. B. PITTS,
 HELEN P. LEVALLEY.